United States Patent Office 3,200,152
Patented Aug. 10, 1965

3,200,152
α,α'-DI-(SUBSTITUTED AND UNSUBSTITUTED AMINO PHENYL)α,α,α' - TETRA ALKYL - p-XYLENE
Heinrich Ruppert, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Dec. 18, 1962, Ser. No. 245,373
Claims priority, application Germany, Dec. 22, 1961, F 35,623
4 Claims. (Cl. 260—570)

The present invention is concerned with new and useful aromatic amino compounds and the production thereof. More particularly, the present invention relates to new aromatic amino compounds of the general formula:

(I) 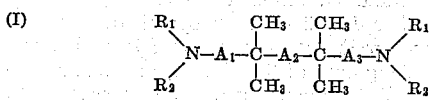

wherein $R_1$ and $R_2$ are the same or different and are substituents selected from the group consisting of hydrogen, the monovalent unbranched and branched saturated hydrocarbon radicals with up to 6 carbon atoms and the cyclohexyl radical, $A_1$ and $A_3$ are bivalent aromatic nuclei selected from the group consisting of o-phenylene and p-phenylene, which may be substituted by radicals selected from the group consisting of monovalent unbranched and branched saturated hydrocarbon radicals with up to 6 carbon atoms, the cyclohexyl radical, chlorine, bromine, and the amino group, and $A_2$ is a bivalent aromatic nucleus selected from the group consisting of m-phenylene and p-phenylene, which may be substituted by radicals selected from the group consisting of monovalent unbranched and branched saturated hydrocarbon radicals with up to 6 carbon atoms, the cyclohexyl radical, chlorine and bromine.

These new compounds can be prepared by reacting one mol of a compound of the general formula:

II  X—A$_2$—X wherein $A_2$ is a bivalent aromatic nucleus as defined above, and X is one of the substituents:

wherein Y is a monovalent substituent selected from the group consisting of the hydroxy group, chlorine, bromine and alkoxy and phenoxy radicals, with at least 2 mols of aromatic amino compounds selected from the group consisting of aniline, N-alkyl-anilines and N,N-dialkyl-anilines with up to 6 carbon atoms in the alkyl-substituents, and N-cycloalkyl-anilines, wherein said aromatic amino compounds may be substituted in the aromatic nucleus by substituents selected from the group consisting of monovalent unbranched or branched saturated hydrocarbon radicals with up to 6 carbon atoms, the cyclohexyl radical, chlorine, bromine, and the amino group.

If the X's in general Formula II signify:

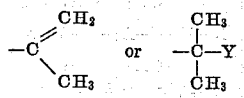

the above-mentioned aromatic amino compounds are reacted with p- or m-diisopropenyl benzenes which, for example, can be produced by dehydrogenation of the corresponding diisopropyl benzenes or splitting off water from the corresponding dicarbinols or by splitting off hydrogen halide from the corresponding dihalo compounds.

If these compounds are reacted with the aromatic amino compounds, then particularly high yields of the new amino compounds are obtained, if the reaction components are allowed to react with one another, with heating, in the presence of a salt of one of the above-mentioned aromatic amino compounds, with a strong acid, for example, hydrogen fluoride, hydrogen chloride, hydrogen bromide, perchloric acid, sulphuric acid or benzene- or toluene sulphonic acid, or an acid ionic exchanger or an acidic earth, as a catalyst.

In this reaction, the aromatic amino compounds can be applied in stoichiometrical amounts with respect to the diisopropenyl benzenes, i.e. for each mol of a diisopropenyl benzene there are added to the reaction mixture two mols of the aromatic amino compound. Better results, however, can often be obtained by using an excess of the aromatic amino compound. Good results are obtained, for example, by the addition of up to 4 mols of the aromatic amino compound per mol of the diisopropenyl benzene. Furthermore, it is also possible to replace a certain amount of the aromatic amino compound by the corresponding salt of the aromatic amino compound with one of the above mentioned strong acids. The catalysts which can be used according to the present invention can be applied in varying amounts from 0.05 to 4 mols of the catalyst salt, preferably 2 mols, per mol diisopropenyl benzene. A polymerization of the diisopropenyl benzene to indane derivatives, which, as is known, readily takes place in the presence of Friedel-Craft's catalysts, such as tin tetrachloride or aluminum chloride, surprisingly hardly occurs at all in the present case.

If the two X's in general Formula II signify:

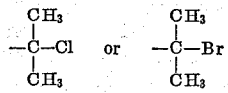

the aromatic amino compounds are reacted with α,α,α',α'-tetramethyl-p- or -m-xylene dichlorides or dibromides, which can be obtained in outstanding yields, for example, by the action of a halogen on the corresponding diisopropyl benzene.

The reaction of the above mentioned xylene dihalides with the aromatic amino compounds is effected by mixing the two reaction compounds, the amino compound expediently being added in excess with respect to the xylene dihalide, the excess being up to two mols over the xylene dihalide, and heating the reaction mixture to about 100–250° C. In this case, a catalyst is not necessary. The reaction is, in general, terminated after about 10–30 minutes. In many cases, the hydrogen halide salt of the new amino compounds thereby crystallizes from the reaction mixture.

If the two X's in Formula II signify:

in which Y' is a hydroxyl, alkoxy, or phenoxy radical, then it is a question of α,α,α',α'-tetramethyl-p- or -m-dihydroxy- or -dialkoxy xylenes, such as, for instance, α,α,α',α'-tetramethyl-p- or -m-dimethoxy, or -diethoxy-xylene, or diphenoxy xylenes, such as, for instance, α,α,α',α'-tetramethyl-p- or -m-diphenoxy-xylene, which can be obtained under alkaline reaction conditions and in good yields by the reaction of α,α,α',α'-tetramethyl-p- or -m-xylene dihalides with the corresponding alcohols or phenols. It is understood that the α,α,α',α'-tetramethyl-p- or -m-xylenes can carry instead of the above-mentioned alkoxy substituents also other unbranched or branched alkoxy substituents with up to 6 carbon atoms, such as propoxy, butoxy, isobutoxy, hexoxy and so on.

The reaction of these xylenes with an aromatic amino compound of the above-mentioned type is carried out in the presence of a salt of the aromatic amino compound with a strong acid of the above-mentioned type.

Aromatic amino compounds which are suitable for the production of the new compounds according to the present invention are, for example, aniline, o-, m- and p-methyl, ethyl, propyl, isopropyl, butyl, isobutyl and cyclohexyl aniline, 3,5- and 2,6-dimethyl and -diethyl aniline, o-, m- and p-chloro and bromo aniline, 3,5- and 2,6-dichloro and dibromo aniline, o-, m- and p-phenylene diamine, N-methyl-, ethyl-, propyl-, isopropyl- and cyclohexyl aniline, N-methyl- and N-ethyl-o-, m- and p-methyl and ethyl aniline, N-methyl- and -ethyl-3,5- and 2,6-dimethyl- and diethyl aniline, N-methyl and -ethyl-o-, m- and p-chloro and bromo aniline, N-methyl- and -ethyl-3,5- and 2,6-dichloro- and dibromo aniline.

The new aromatic amino compounds of the Formula I can be used as anti-oxidants for, for example, synthetic resins, and as intermediate products for organic synthesis.

The following examples are given for the purpose of illustrating the present invention:

Example 1

A mixture of 279 grams of aniline, 129 grams of aniline hydrochloride and 158 grams of p-diisopropenyl benzene is heated at 180–200° C., under an atmosphere of nitrogen. After 5 minutes, the hydrochloride of α,α'-di-(4-aminophenyl)-α,α,α',α'-tetramethyl-p-xylene begins to crystallize out. After 10 minutes, the reaction mixture has become almost solid. It is heated for a further 30 minutes at 200° C. After cooling to 80° C., it is mixed with a solution of 40 grams of sodium hydroxide in 200 milliliters water. The liquid organic layer is separated from the aqueous layer, washed with water and dried. The excess of aniline is distilled off in a vacuum. As residue, there are obtained 297 grams (86.5% of theory) of α,α'-di-(4 aminophenyl)-α,α,α',α'-tetramethyl-p-xylene. The compound can be further purified by recrystallization from, for example, toluene, or by distillation. Melting point 163° C.; boiling point 230° C./0.1 mm. Hg.

Example 2

A mixture of 465 grams of aniline and 231 grams of α,α'-dichloro-α,α,α',α'-tetramethyl-p-xylene is heated to 190–200° C. for 30 minutes. After 10 minutes, the main amount of the hydrochloride of α,α'-di-(4-aminophenyl)-α,α,α',α'-tetramethyl-p-xylene crystallizes out. After cooling to 80° C., 80 grams of sodium hydroxide in 300 milliliters water are added. Further working up is carried out as described in Example 1. The yield amounts to 262 grams (76% of theory).

Example 3

A mixture of 279 grams of aniline, 158 grams of p-diisopropenyl benzene and 50 grams of fuller's earth are heated, with stirring, at 200° C., for 1½ hours. The reaction mixture is thereafter hot filtered and the reaction mixture fractionally distilled. At 0.1 mm. Hg and 230–237° C. there are obtained 222 grams (64.5% of theory) of α,α', - di - (4-aminophenyl) - α,α,α',α' - tetramethyl-p-xylene.

Example 4

Proceeding as described in Example 2 but using 535 grams of N-methylaniline instead of aniline, there are obtained 269 grams (72% of theory) of α,α'-di-(4-N-methylaminophenyl)-α,α,α',α'-tetramethyl-p-xylene (melting point 123° C.).

Example 5

Proceeding as described in Example 1 but using 387 grams of aniline hydrochloride, 93 grams of aniline and 158 grams of m-diisopropenyl benzene, there are obtained 318 grams of α,α,α',α'-tetramethyl-α,α'-di-(4-aminophenyl)-m-xylene (melting point 114.5° C.).

Example 6

Proceeding as described in Example 1 but using 222 grams of α,α,α',α'-tetramethyl-α,α'-dimethoxy-p-xylene instead of 158 grams of p-diisopropenyl benzene, there are obtained 276 grams of α,α,α',α'-tetramethyl-α,α'-di-(4-aminophenyl)-p-xylene (melting point 163° C.).

Example 7

Proceeding as described in Example 1 but using 194 grams of α,α,α',α'-tetramethyl-α,α'-dihydroxy-p-xylene instead of 158 grams of p-diisopropenyl benzene, there are obtained 273 grams of α,α,α',α'-tetramethyl-α,α'-di-(4-aminophenyl)-p-xylene (melting point 163° C.).

Example 8

164 grams of 3-chloroaniline hydrochloride, 127 grams of 3-chloroaniline and 39.5 grams of p-diisopropenyl benzene were heated to 190–210° C. under nitrogen for 60 minutes. Thereafter the reaction mixture is cooled and admixed with 105 grams of 10 N aqueous sodium hydroxide solution. The organic layer is than washed with water, freed from the excess of 3-chloroaniline by distillation and the residue thus obtained is recrystallized from n-butanol. Thus, 72.5 grams of α,α,α',α'-tetramethyl-α,α'-di-(2-chloro-4-aminophenyl)-p-xylene (melting point 215° C.) are obtained.

Example 9

Proceeding as described in Example 8 but using 143 grams of the hydrochloride of 2-amino toluene, 107 grams of 2-amino-toluene and 39.5 grams of p-diisopropenyl benzene, there are obtained 81 grams of α,α,α',α'-tetramethyl-α,α'-di-(3-methyl-4-aminophenyl)-p-xylene (melting point 131° C.).

Example 10

Proceeding as described in Example 8 but using 157.5 grams of N,N-dimethyl-aniline-hydrochloride, 121 grams of N,N-dimethyl aniline and 39.5 grams of p-diisopropenyl benzene, there are obtained 89 grams of α,α,α',α'- tetramethyl-α,α'-di-(4-(N,N-dimethylamino)-phenyl)-p-xylene (melting point 141° C.).

We claim:

1. Aromatic amino compounds of the formula:

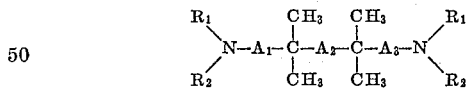

wherein $R_1$ and $R_2$ are substituents selected from the group consisting of hydrogen, saturated alkyl having up to 6 carbon atoms and cyclohexyl, $A_1$ and $A_3$ are bivalent aromatic nuclei selected from the group consisting of o-phenylene, p-phenylene and substituted derivatives thereof wherein the substituents are selected from the group consisting of monochloro, dichloro, monobromo, dibromo, monoamino, monocyclohexyl, mono saturated alkyl having up to 6 carbon atoms and di saturated alkyl having up to 6 carbon atoms and $A_2$ is a bivalent aromatic nucleus selected from the group consisting of m-phenylene and p-phenylene.

2. α,α'-di-(4-aminophenyl)-α,α',α'-tetramethyl-p-xylene.

3. α,α' - di - (4-N-methylaminophenyl)-α,α,α',α'-tetramethyl-p-xylene.

4. A process for the production of aromatic amino compounds of the formula:

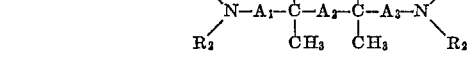

wherein $R_1$ and $R_2$ are substituents selected from the group consisting of hydrogen, saturated alkyl having up to 6 carbon atoms and cyclohexyl, $A_1$ and $A_3$ are bivalent aromatic nuclei selected from the group consisting of o-phenylene, p-phenylene and substituted derivatives thereof wherein the substituents are selected from the group consisting of monochloro, dichloro, monobromo, dibromo, monoamino, monocyclohexyl, mono saturated alkyl having up to 6 carbon atoms and di saturated alkyl having up to 6 carbon atoms and $A_2$ is a bivalent aromatic nucleus selected from the group consisting of m-phenylene and p-phenylene, which comprises reacting one mol of a compound of the formula:

$$X—A_2—X$$

wherein $A_2$ is a bivalent aromatic nucleus as defined above, and X is a substituent selected from the group consisting of

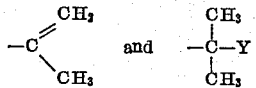

wherein Y is a monovalent substituent selected from the group consisting of hydroxy, chlorine, bromine, alkoxy having up to 6 carbon atoms and phenoxy with at least 2 mols of aromatic amino reactant compound selected from the group consisting of aniline, N-alkyl-anilines and N,N-dialkyl-anilines having up to 6 carbon atoms in the alkyl substituents, and N-cycloalkyl-anilines, wherein said aromatic amino reactant compound may be substituted in the aromatic nucleus by substituents selected from the group consisting of monobromo, dibromo, mono-chloro, dichloro, monoamino, monocyclohexyl, mono saturated alkyl having up to 6 carbon atoms and di saturated alkyl having up to 6 carbon atoms, said reaction occurring in the presence of a salt of a strong acid and an amino reactant compound as described above.

References Cited by the Examiner

FOREIGN PATENTS 620,573  5/61  Canada.

CHARLES B. PARKER, *Primary Examiner.*